May 30, 1950 C. E. KILGOUR 2,509,356

STYLUS MOUNTING FOR SOUND REPRODUCERS

Original Filed April 3, 1946

INVENTOR.
CHARLES E. KILGOUR
BY Alden D. Redfield
Charles M. Hogan
ATTYS.

Patented May 30, 1950 2,509,356

UNITED STATES PATENT OFFICE 2,509,356

STYLUS MOUNTING FOR SOUND REPRODUCERS

Charles E. Kilgour, Cincinnati, Ohio, assignor, by mesne assignments, to Avco Manufacturing Corporation, a corporation of Delaware Original application April 3, 1946, Serial No. 659,215. Divided and this application April 1, 1949, Serial No. 84,899

3 Claims. (Cl. 274—37)

Figure 1:
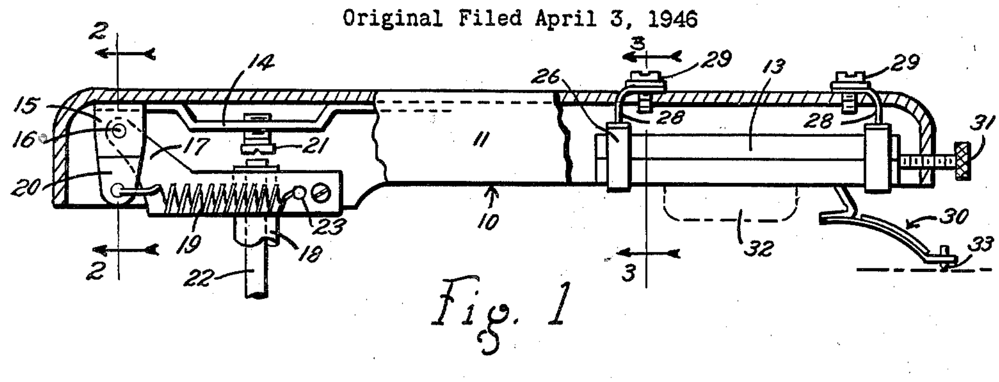

The present invention is a division of my patent application Serial No. 659,215, filed April 3, 1946, and it relates to a novel stylus mounting assembly for use in sound reproduction devices on phonographs.

The object of the present invention is to provide a stylus mounting assembly which reduces needle scratch and other high frequency vibrations.

For a better understanding of the present invention, together with other and further objects, advantages, and capabilities thereof, reference is made to the following description of the accompanying drawings, in which there is illustrated a preferred form of stylus assembly in accordance with the present invention.

Figure 2:
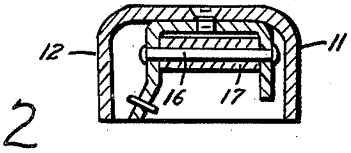
Figure 3:
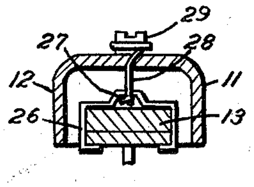
Figure 4:
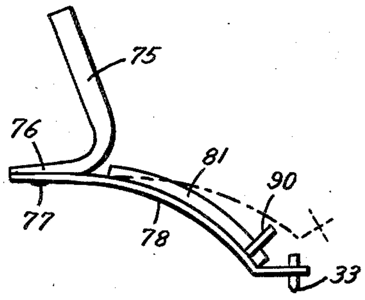
Figure 5:
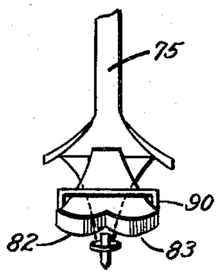
Figure 6:
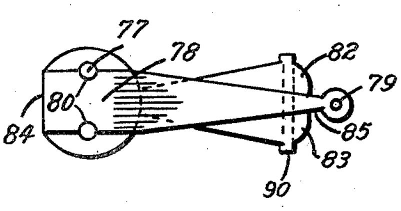

In the drawings:

Fig. 1 is a side elevational view, partly broken away, showing a stylus assembly in accordance with the invention installed in a tone arm;

Figs. 2 and 3 are, respectively, sectional views taken along the lines 2—2 and 3—3 of Fig. 1, looking in the direction of the arrows;

Figs. 4, 5, and 6 are side elevational, front, and bottom views of a preferred form of stylus assembly in accordance with the invention.

In Figs. 1 to 3 a tone arm 10 is provided with down-turned sides 11 and 12, and at the end thereof a motion translating means 13 such as a crystal cartridge is mounted in the manner hereinafter described. At the other end of the tone arm is provided a reinforcing bracket 14 secured to the upper side of the arm and this bracket has down-turned ears 15 having openings to receive a pivot 16 supported in a member 17 that is mounted on the sleeve 18. As will be recognized, this illustrates a more or less standard form of construction in which the tone arm is mounted so that it may be moved in a horizontal plane by a record changing mechanism that turns sleeve 18 at predetermined intervals.

In order to balance the weight of the device at the other end of the tone arm, a spring 19 may be tensioned between lug 23, secured to member 17, and an extension 20 on one of the ears 15 of member 14. This tends to cause the other end of the tone arm to move upwardly about the pivot 16.

An adjustable screw 21 is secured to member 14 at a point opposite a push rod 22 connected to the record changing mechanism. As is well known in the art, the rod 22 periodically rises to lift the tone arm so that the stylus mounting device 30 carrying the stylus or needle 33 is disengaged from the record.

In Figs. 1 and 3, the crystal cartridge is mounted by hanging the same on flexible cords 28. Each end of the cartridge is carried by a stirrup 26 that can be snapped into place, and each stirrup is provided centrally with a boss 27 in which is provided a suitable opening. Studs 29 may be secured in the top of the tone arm and the cords 28 thereby adjustably secured in position as shown in the figures. As shown, the lower ends of the cords are knotted in order to hold them in place against the under side of the openings in bosses 27.

In Fig. 1 a stylus mounting 30 is shown by means of which a stylus 33 is mounted in the cartridge 13. A knurled screw 31 is provided by which the shank of the stylus mounting means is held in a suitable chuck (not shown) provided in the cartridge. A weight 32 may be provided on the under side of the cartridge if desired in order to obtain proper relationships between tension on the cords, the weight of the cartridge and the force exerted against the needle by the record.

The cartridge mounting illustrated in Figs. 1, 2, and 3 is disclosed and claimed in my said copending patent application Serial No. 659,215, filed April 3, 1946, entitled "Sound reproduction" and assigned to the same assignee as the present application and invention.

In Figs. 4, 5, and 6 I show a stylus mounting assembly in accordance with the invention. It is particularly effective in reducing needle scratch and other high frequency vibrations. It comprises a shank 75 having an end 76 bent at approximately the angle shown. The under side of the bent end 76 has bosses 77 adapted to be swaged over to hold spring member 78 securely against the overturned end 76. Spring member 78 has notches 80 in its sides that closely fit around the sides of the bosses and conform to their contours. Spring member 78 may conveniently be made of resilient springy material such as beryllium bronze.

The other end of the spring 78 is provided with an opening 79 in which a permanent point stylus such as a sapphire 33 is press fitted. A damping member 81 is provided along one side, preferably the upper side of the spring member 78. Member 81 is cemented or otherwise secured along the whole upper surface of member 78 and is extended horizontally, as in the form of heart-shaped lobes 82 and 83. The mass of member 81 is thus spread out and distributed in a horizontal plane rather than being concentrated at one point. The construction, configuration and mass of the damping material 81 and its distribution over the surface of spring 78 are such that a very effective damping of peak resonances at the high frequency end of the audio range is achieved. Member 81 may be conveniently made of any suitable damping material such as a plasticized Celluloid.

In order to maintain the bending stress uniform throughout its length, the flat spring member 78 is made with a relatively wide base 84 and narrow end 85 as shown in Fig. 6, enlarged again at its outer end for the purpose of receiving and holding stylus 33.

It should be noted that the point of the needle 33 is in substantial alignment with the plane of spring 78 when the weight of the pickup is on the record, as indicated in dot and dash lines in Fig. 4. This minimizes the torsional forces upon the spring 78 and tends to decrease its compliance in a horizontal plane. This also makes it possible to obtain maximum twisting effect on the crystal where the forces from the record are applied by the shank 75. Nevertheless, a large amount of vertical compliance is permitted. Since substantial forces are exerted on the needle by reason of the tortuous character of the grooves and rapid changes in groove width—that tend to raise and lower the whole pickup—this vertical compliance in cooperation with the damping means acts as a mechanical filter to effect a substantial diminution in high frequency noise, not only with respect to that radiated acoustically but also that which is transmitted electrically.

The base 84 of the spring member 78 may be enlarged so that it coincides with the full surface of the bottom side of out-turned member 76, and openings 80 may be holes instead of notches to fit over the bosses 77*a* of member 76*a*. This strengthens the construction considerably.

In addition, the damping effect may be very considerably enhanced by the provision of a bracing member 90 made of aluminum, magnesium, or some light relatively stiff metal alloy or other material. As illustrated, this additional damping member is constructed of a U shape as shown in Figs. 4, 5, and 6, and the ends of the U are secured as by cementing or clamping them to the sides of the lobes 82 and 83 of the damping means 81. The mass of member 90 should be kept to a minimum. Tying the edges together strengthens the spread-out dampening member 81, increases the dampening effect and reduces needle scratch and other undesirable highs.

While there has been shown and described what is at present considered to be the preferred embodiment of the present invention, it will be obvious to those skilled in the art that various modifications and substitutions of equivalents may be made therein without departing from the true scope of the invention as defined by the appended claims.

Having thus described and disclosed my invention, I claim:

1. In a phonograph needle assembly of the type comprising a flat spring-like member which converges toward the needle, the improvement which comprises a heart-shaped sheet of acoustic damping material secured to the upper face of said member and having lobes which diverge outwardly a substantial distance beyond the width of the spring-like member at the narrow end of said member.

2. In a phonograph needle assembly of the type comprising a flat spring-like member which converges toward the needle, the improvement which comprises, in combination, a heart-shaped sheet of damping material, said damping material being secured to the upper flat side of said member and having lobes extending beyond said member, and a U-shaped bridging member having opposing ends secured to opposite lobes of the sheet of damping material and a central portion overlying and transverse to said sheet.

3. A phonograph needle assembly comprising a needle point and a flat spring member operatively disposed substantially in a plane parallel to that of the phonograph record and a heart-shaped sheet of damping material disposed adjacent and in adherence to the upper flat surface of said member, said needle point being secured in one end of said member, said member being relatively narrow at the end supporting said needle point and increasing in width towards the other end, said damping material being substantially wider than and having lobes extending outwardly of said member at the end adjacent said needle point, and means for synchronizing the vertical movements of said lobes comprising an inverted generally U-shaped stiff metallic clamping member having a central portion overlying and extending across said sheet and arms individually secured to said lobes.

CHARLES E. KILGOUR.

REFERENCES CITED

The following references are of record in the file of this patent:

UNITED STATES PATENTS

| Number | Name | Date |
|---|---|---|
| 1,281,135 | Claybrook | Oct. 8, 1918 |
| 1,397,835 | Elmer | Nov. 22, 1921 |
| 1,435,095 | Adams | Nov. 7, 1922 |
| 2,325,343 | Semple | July 27, 1943 |
| 2,455,913 | Bauer | Dec. 14, 1948 |